(12) United States Patent
Beaurepaire et al.

(10) Patent No.: US 11,691,643 B2
(45) Date of Patent: Jul. 4, 2023

(54) METHOD AND APPARATUS TO IMPROVE INTERACTION MODELS AND USER EXPERIENCE FOR AUTONOMOUS DRIVING IN TRANSITION REGIONS

(71) Applicant: HERE Global B.V., Eindhoven (NL)

(72) Inventors: Jerome Beaurepaire, Berlin (DE); Leon Stenneth, Chicago, IL (US); Jeremy Michael Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/090,473

(22) Filed: Nov. 5, 2020

(65) Prior Publication Data
US 2022/0063654 A1    Mar. 3, 2022

Related U.S. Application Data

(60) Provisional application No. 63/071,133, filed on Aug. 27, 2020.

(51) Int. Cl.
*B60W 60/00* (2020.01)
*B60W 40/08* (2012.01)
(Continued)

(52) U.S. Cl.
CPC .......... *B60W 60/001* (2020.02); *B60W 40/08* (2013.01); *B60W 50/14* (2013.01);
(Continued)

(58) Field of Classification Search
CPC combination set(s) only.
See application file for complete search history.

(56) References Cited

U.S. PATENT DOCUMENTS

| 8,762,048 B2 | 6/2014 | Kosseifi et al. |
| 9,365,213 B2 | 6/2016 | Stenneth et al. |

(Continued)

FOREIGN PATENT DOCUMENTS

| KR | 2020-0020324 A | 2/2020 |
| WO | WO 2013/087514 A1 | 6/2013 |

(Continued)

OTHER PUBLICATIONS

Dixit et al., "Autonomous Vehicles: Disengagements, Accidents and Reaction Times", PLoS One 11(12): 30168054., doi:10.1371/journal.pone.0168054 (Dec. 20, 2016).

(Continued)

*Primary Examiner* — Anne Marie Antonucci
*Assistant Examiner* — Patrick M Brady
(74) *Attorney, Agent, or Firm* — Alston & Bird LLP

(57) ABSTRACT

A method, apparatus and computer program product are provided for improving user experiences for autonomous driving. In context of a method, the method determines one or more autonomous transition region parameters for a respective autonomous transition region along a route. The method also, based on the one or more autonomous transition region parameters, determines whether an action is to be performed by a vehicle in accordance with user preference data associated with a user. The method also causes the vehicle to perform the action in accordance with a determination that the action is to be performed by the vehicle.

18 Claims, 7 Drawing Sheets

(51) Int. Cl.
  *G01C 21/34* (2006.01)
  *B60W 50/14* (2020.01)
  *G01C 21/36* (2006.01)
  *G06N 20/00* (2019.01)

(52) U.S. Cl.
  CPC ..... *G01C 21/3415* (2013.01); *G01C 21/3484* (2013.01); *G01C 21/3617* (2013.01); *G01C 21/3626* (2013.01); *G06N 20/00* (2019.01); *B60W 2050/146* (2013.01); *B60W 2540/047* (2020.02); *B60W 2540/049* (2020.02); *B60W 2540/30* (2013.01); *B60W 2556/10* (2020.02)

(56) References Cited

U.S. PATENT DOCUMENTS

| | | | |
|---|---|---|---|
| 9,581,460 | B1 | 2/2017 | McNew et al. |
| 9,587,952 | B1 | 3/2017 | Slusar |
| 9,588,517 | B2 | 3/2017 | Laur et al. |
| 9,688,288 | B1 | 6/2017 | Lathrop et al. |
| 10,222,796 | B2 | 3/2019 | Ichikawa et al. |
| 10,295,363 | B1 | 5/2019 | Konrardy et al. |
| 10,337,864 | B2 | 7/2019 | Nagy et al. |
| 10,451,428 | B2 | 10/2019 | Lathrop et al. |
| 10,503,168 | B1 | 12/2019 | Komardy et al. |
| 10,543,841 | B2 | 1/2020 | Karlsson et al. |
| 10,545,024 | B1 | 1/2020 | Komardy et al. |
| 10,551,835 | B2 | 2/2020 | Mason et al. |
| 10,595,175 | B2 | 3/2020 | Ramalho de Oliveira |
| 2012/0165046 | A1 | 6/2012 | Rhoads et al. |
| 2014/0309833 | A1 | 10/2014 | Ferguson et al. |
| 2015/0253772 | A1 | 9/2015 | Solyom et al. |
| 2016/0334797 | A1 | 11/2016 | Ross et al. |
| 2016/0358477 | A1 | 12/2016 | Ansari et al. |
| 2017/0010613 | A1 | 1/2017 | Fukumoto |
| 2017/0102700 | A1* | 4/2017 | Kozak ............... B60W 30/00 |
| 2017/0122749 | A1 | 5/2017 | Urano et al. |
| 2017/0123419 | A1 | 5/2017 | Levinson et al. |
| 2017/0160742 | A1 | 6/2017 | Ross et al. |
| 2017/0212525 | A1 | 7/2017 | Wang et al. |
| 2017/0227971 | A1* | 8/2017 | Shimotani ............ G05D 1/0285 |
| 2017/0248963 | A1 | 8/2017 | Levinson et al. |
| 2017/0301235 | A1 | 10/2017 | Endo |
| 2017/0352125 | A1 | 12/2017 | Dicker et al. |
| 2018/0004211 | A1 | 1/2018 | Grimm et al. |
| 2018/0107216 | A1 | 4/2018 | Beaurepaire et al. |
| 2018/0237012 | A1 | 8/2018 | Jammoussi et al. |
| 2018/0266833 | A1 | 9/2018 | Carlson et al. |
| 2018/0335776 | A1* | 11/2018 | Theis ............... B60W 50/082 |
| 2018/0339712 | A1 | 11/2018 | Kislovskiy et al. |
| 2018/0340790 | A1 | 11/2018 | Kislovskiy et al. |
| 2018/0362031 | A1 | 12/2018 | Chang et al. |
| 2018/0376357 | A1 | 12/2018 | Tavares Coutinho et al. |
| 2019/0005412 | A1 | 1/2019 | Matus et al. |
| 2019/0041228 | A1 | 2/2019 | Singhal |
| 2019/0049259 | A1* | 2/2019 | Galan-Oliveras ............ G01C 21/3415 |
| 2019/0049990 | A1 | 2/2019 | Jafari Tafti et al. |
| 2019/0061782 | A1 | 2/2019 | Cheaz et al. |
| 2019/0064803 | A1 | 2/2019 | Frazzoli et al. |
| 2019/0096250 | A1 | 3/2019 | Nix et al. |
| 2019/0110103 | A1 | 4/2019 | el Kaliouby et al. |
| 2019/0120640 | A1 | 4/2019 | Ho et al. |
| 2019/0135302 | A1 | 5/2019 | Kishi et al. |
| 2019/0146508 | A1 | 5/2019 | Dean et al. |
| 2019/0163176 | A1* | 5/2019 | Wang ............... G05D 1/0027 |
| 2019/0186936 | A1 | 6/2019 | Ebner et al. |
| 2019/0202467 | A1 | 7/2019 | Sun et al. |
| 2019/0232955 | A1 | 8/2019 | Grimm et al. |
| 2019/0232976 | A1 | 8/2019 | Uetani et al. |
| 2019/0333120 | A1 | 10/2019 | Ross et al. |
| 2020/0005206 | A1 | 1/2020 | van Ryzin et al. |
| 2020/0010077 | A1 | 1/2020 | Cormack et al. |
| 2020/0012873 | A1 | 1/2020 | Kim |
| 2020/0039525 | A1 | 2/2020 | Hu et al. |
| 2020/0056892 | A1 | 2/2020 | Haque et al. |
| 2020/0057451 | A1 | 2/2020 | Robert et al. |
| 2020/0079355 | A1 | 3/2020 | Chen |
| 2020/0139979 | A1 | 5/2020 | Kawanai et al. |
| 2020/0150652 | A1 | 5/2020 | Urano et al. |
| 2020/0174470 | A1 | 6/2020 | Park et al. |
| 2020/0233426 | A1 | 7/2020 | Johnson et al. |
| 2020/0241526 | A1 | 7/2020 | Kim et al. |
| 2020/0264605 | A1 | 8/2020 | Chi-Johnston et al. |
| 2020/0264608 | A1 | 8/2020 | Rosati et al. |
| 2020/0327812 | A1 | 10/2020 | Ran et al. |
| 2020/0356100 | A1 | 11/2020 | Nagarajan et al. |
| 2021/0034059 | A1 | 2/2021 | Nagata et al. |
| 2021/0048815 | A1 | 2/2021 | McErlean et al. |
| 2021/0063162 | A1 | 3/2021 | Moskowitz et al. |
| 2021/0063178 | A1 | 3/2021 | Modi et al. |
| 2021/0122398 | A1 | 4/2021 | Kim |
| 2021/0163021 | A1 | 6/2021 | Frazzoli et al. |
| 2021/0233284 | A1 | 7/2021 | Sugio et al. |
| 2021/0239476 | A1 | 8/2021 | Duym et al. |
| 2021/0247199 | A1 | 8/2021 | Johnson et al. |
| 2021/0341940 | A1 | 11/2021 | Baik |
| 2022/0194433 | A1 | 6/2022 | Nagata et al. |

FOREIGN PATENT DOCUMENTS

| | | |
|---|---|---|
| WO | WO 2013/165297 A1 | 11/2013 |
| WO | WO 2019/095013 A1 | 5/2019 |
| WO | WO 2019/118465 A2 | 6/2019 |
| WO | WO 2020/058431 A1 | 3/2020 |

OTHER PUBLICATIONS

Favaro et al., "Analysis of Disengagements in Semi-Autonomous Vehicles: Drivers Takeover Performance and Operational Implications", Mineta Transportation Institute, Project 1710 (Jun. 2019), 83 pages.

Favaro et al., "Autonomous Vehicle's Disengagements: Trends, Triggers, and Regulatory Limitations", Accident; Analysis and Prevention 110 (Nov. 1, 2017), pp. 136-148.

Gavanas, Nikolaos, "Autonomous Road Vehicles: Challenges for Urban Planning in European Cities", Urban Science (Jun. 3, 2019), 3, 61, 13 pages.

KPMG International Cooperative, "Assessing Countries' Preparedness for Autonomous Vehicles", KPMG 2019 Autonomous Vehicles Readiness Index (Mar. 2019), 56 pages.

Lv et al., "Analysis of Autopilot Disengagements Occurring During Autonomous Vehicle Testing", IEEE/CAA Journal of Automatica Sinica, vol. 5, No. 1 (Jan. 2018), pp. 58-68.

Extended European Search Report for European Application No. 21192183.8 dated Jan. 26, 2022, 11 pages.

Extended European Search Report for European Application No. 21192135.8 dated Feb. 3, 2022, 12 pages.

Non-Final Office Action for U.S. Appl. No. 17/122,452 dated May 18, 2022.

Non-Final Office Action for U.S. Appl. No. 17/122,465 dated Aug. 24, 2022.

Non-Final Office Action for U.S. Appl. No. 17/090,437 dated Jun. 3, 2022.

Non-Final Office Action for U.S. Appl. No. 17/090,561 dated Aug. 3, 2022.

Final Office Action for U.S. Appl. No. 17/122,452 dated Oct. 6, 2022.

Final Office Action for U.S. Appl. No. 17/090,437 dated Oct. 17, 2022.

Non-Final Office Action for U.S. Appl. No. 17/090,525 dated Sep. 21, 2022.

Advisory Action for U.S. Appl. No. 17/122,452 dated Dec. 15, 2022.

Non-Final Office Action for U.S. Appl. No. 17/122,497 dated Dec. 6, 2022.

Advisory Action for U.S. Appl. No. 17/090,437 dated Dec. 28, 2022.

(56) References Cited

OTHER PUBLICATIONS

Non-Final Office Action for U.S. Appl. No. 17/122,477 dated Jan. 17, 2023.
Final Office Action for U.S. Appl. No. 17/090,561 dated Jan. 12, 2023.
Non-Final Office Action for U.S. Appl. No. 17/122,452 dated Jan. 31, 2023.
Notice of Allowance for U.S. Appl. No. 17/122,465 dated Feb. 1, 2023.
Final Office Action for U.S. Appl. No. 17/090,525 dated Apr. 6, 2023.
Kamireddy, L., "Decision Making Protocol in Autonomous Vehicles for Optimal Routing and Safe Control", University of Colorado, Department of Electrical, Computer, and Energy Engineering, (2019), 62 pages.
Notice of Allowance for U.S. Appl. No. 17/122,497 dated Mar. 15, 2023.
Office Action for European Application No. 21192183.8 dated Apr. 5, 2023, 9 pages.

* cited by examiner

METHOD AND APPARATUS TO IMPROVE INTERACTION MODELS AND USER EXPERIENCE FOR AUTONOMOUS DRIVING IN TRANSITION REGIONS

CROSS-REFERENCE TO RELATED APPLICATIONS

This application claims the benefit of U.S. Provisional Patent Application No. 63/071,133, filed Aug. 27, 2020, the entire contents of which are incorporated herein by reference.

TECHNOLOGICAL FIELD

An example embodiment relates generally to a method, apparatus and computer program product for improving user experiences for autonomous driving and, more particularly, for improving user experiences based on parameters of autonomous transition regions.

BACKGROUND

An autonomous vehicle is a vehicle including automated mechanisms for performing one or more aspects of vehicle control that have been conventionally performed by the driver. As autonomous vehicles are adopted, several benefits may be realized. For example, vehicle collisions may be reduced because computers can perform driving tasks more consistently and make fewer errors than human operators.

Autonomous vehicles may exhibit different levels of autonomy. Some autonomous vehicles may be equipped with autonomous functionalities such as lane keep assist and cruise control, but may lack the ability to autonomously control steering, accelerating, and braking. Other vehicles may be fully autonomous and able to self-drive with or without an occupant in the vehicle.

Certain regions along a route may influence autonomy levels. For example, in some regions, a vehicle may be able to function at a higher level of autonomy (e.g., self-drive), while in other regions, the vehicle may be required to function at a lower level of autonomy (e.g., require driver intervention and/or control). However, adhering to such transitions in autonomy may not always be ideal for passengers within an autonomous vehicle.

BRIEF SUMMARY

A method, apparatus and computer program product are therefore provided in accordance with an example embodiment in order to improve user experience within autonomous vehicles traversing autonomous transition regions. By identifying and leveraging parameters of autonomous transition regions, user preference data and/or historical mobility patterns, improved user experiences within autonomous vehicles are created with improvements in one or both of the temporal and spatial domains. In this regard, actions to be performed by an autonomous vehicle along a route may be identified in a more efficient manner, thereby leading to reduced network load and an overall improved passenger experience.

In an embodiment, an apparatus is provided including at least one processor and at least one memory storing computer program code, with the at least one memory and the computer program code configured to, with the processor, cause the apparatus to at least, for a respective autonomous transition region of one or more autonomous transition regions along a route, determine one or more autonomous transition region parameters. The at least one memory and the computer program code are also configured to, with the processor, cause the apparatus to, for the respective autonomous transition region, and based at least on the one or more autonomous transition region parameters, determine whether an action is to be performed by a vehicle in accordance with user preference data associated with a user, the user preference data including one or more predefined rules for performing actions of a vehicle. The at least one memory and the computer program code are also configured to, with the processor, cause the apparatus to, in accordance with a determination that the action is to be performed by the vehicle, cause the vehicle to perform the action.

In some embodiments of the apparatus, the action comprises at least one of an engagement or a disengagement.

In some embodiments of the apparatus, the user preference data comprises user task data associated with one or more tasks the user is to perform within the vehicle, and the determination of whether the action is to be performed is further based on at least one of the one or more tasks the user is performing within the vehicle during traversal of the route.

In some embodiments of the apparatus, the user preference data further comprises historical route traversal data associated with the user, and the determination of whether the action is to be performed is further based on a determination of whether the historical route traversal data comprises data indicative of the user having previously traversed at least a portion of the route.

The at least one memory and the computer program code of an example embodiment are further configured to, with the processor, cause the apparatus to, in accordance with a determination that the vehicle is within a predefined distance of an autonomous transition region, cause presentation of a notification including information related to the autonomous transition region to the user.

In some embodiments of the apparatus, the determination of whether the action is to be performed is further in accordance with additional user preference data associated with at least one additional user in an instance in which the user and the at least one additional user occupy the vehicle.

In some embodiments of the apparatus, in an instance in which more than one user occupies the vehicle, the user preference data associated with a priority user of the more than one user is utilized in accordance with the determination of whether the action is to be performed.

The at least one memory and the computer program code of an example embodiment are further configured to, with the processor, cause the apparatus to, in response to the performance of the action or an inaction by the vehicle, cause presentation of a notification including information related to the action or the inaction, receive a user input including a future preference associated with the action or the inaction, and update the user preference data to include data associated with the future preference.

The at least one memory and the computer program code of an example embodiment are further configured to, with the processor, cause the apparatus to, in response to the performance of the action or an inaction by the vehicle, receive perception data from one or more sensors, with the perception data indicative of an emotional reaction of the user to the action or the inaction, and update the user preference data based at least on the perception data.

In an embodiment, an apparatus is provided including means for determining, for a respective autonomous transition region of one or more autonomous transition regions along a route, one or more autonomous transition region parameters. The apparatus also includes means for determining, for the respective autonomous transition region, and based at least on the one or more autonomous transition region parameters, whether an action is to be performed by a vehicle in accordance with user preference data associated with a user, the user preference data including one or more predefined rules for performing actions of a vehicle. The apparatus also includes means for, in accordance with a determination that the action is to be performed by the vehicle, causing the vehicle to perform the action.

In some embodiments of the apparatus, the action comprises at least one of an engagement or a disengagement.

In some embodiments of the apparatus, the user preference data comprises user task data associated with one or more tasks the user is to perform within the vehicle, and the determination of whether the action is to be performed is further based on at least one of the one or more tasks the user is performing within the vehicle during traversal of the route.

In some embodiments of the apparatus, the user preference data further comprises historical route traversal data associated with the user, and the determination of whether the action is to be performed is further based on a determination of whether the historical route traversal data comprises data indicative of the user having previously traversed at least a portion of the route.

The apparatus of an example embodiment further includes means for, in accordance with a determination that the vehicle is within a predefined distance of an autonomous transition region, causing presentation of a notification comprising information related to the autonomous transition region to the user.

In some embodiments of the apparatus, the determination of whether the action is to be performed is further in accordance with additional user preference data associated with at least one additional user in an instance in which the user and the at least one additional user occupy the vehicle.

In some embodiments of the apparatus, in an instance in which more than one user occupies the vehicle, the user preference data associated with a priority user of the more than one user is utilized in accordance with the determination of whether the action is to be performed.

The apparatus of an example embodiment further includes means for, in response to the performance of the action or an inaction by the vehicle, causing presentation of a notification comprising information related to the action or the inaction, means for receiving a user input comprising a future preference associated with the action or the inaction, and means for updating the user preference data to include data associated with the future preference.

The apparatus of an example embodiment further includes means for, in response to the performance of the action or an inaction by the vehicle, receiving perception data from one or more sensors, with the perception data indicative of an emotional reaction of the user to the action or the inaction, and means for updating the user preference data based at least on the perception data.

In an embodiment, a method is provided including determining, for a respective autonomous transition region of one or more autonomous transition regions along a route, one or more autonomous transition region parameters. The method also includes determining, for the respective autonomous transition region, and based at least on the one or more autonomous transition region parameters, whether an action is to be performed by a vehicle in accordance with user preference data associated with a user, the user preference data including one or more predefined rules for performing actions of a vehicle. The method also includes, in accordance with a determination that the action is to be performed by the vehicle, causing the vehicle to perform the action.

In some embodiments of the method, the action comprises at least one of an engagement or a disengagement.

In some embodiments of the method, the user preference data comprises user task data associated with one or more tasks the user is to perform within the vehicle, and the determination of whether the action is to be performed is further based on at least one of the one or more tasks the user is performing within the vehicle during traversal of the route.

In some embodiments of the method, the user preference data further comprises historical route traversal data associated with the user, and the determination of whether the action is to be performed is further based on a determination of whether the historical route traversal data comprises data indicative of the user having previously traversed at least a portion of the route.

The method of an example embodiment further includes, in accordance with a determination that the vehicle is within a predefined distance of an autonomous transition region, causing presentation of a notification comprising information related to the autonomous transition region to the user.

In some embodiments of the method, the determination of whether the action is to be performed is further in accordance with additional user preference data associated with at least one additional user in an instance in which the user and the at least one additional user occupy the vehicle.

In some embodiments of the method, in an instance in which more than one user occupies the vehicle, the user preference data associated with a priority user of the more than one user is utilized in accordance with the determination of whether the action is to be performed.

The method of an example embodiment further includes, in response to the performance of the action or an inaction by the vehicle, causing presentation of a notification comprising information related to the action or the inaction, receiving a user input comprising a future preference associated with the action or the inaction, and updating the user preference data to include data associated with the future preference.

The method of an example embodiment further includes, in response to the performance of the action or an inaction by the vehicle, receiving perception data from one or more sensors, with the perception data indicative of an emotional reaction of the user to the action or the inaction, and updating the user preference data based at least on the perception data.

In an embodiment, a computer program product is provided that includes a non-transitory computer readable medium having program code portions stored thereon with the program code portions being configured, upon execution, to, for a respective autonomous transition region of one or more autonomous transition regions along a route, determine one or more autonomous transition region parameters. The program code portions are also configured to, for the respective autonomous transition region, and based at least on the one or more autonomous transition region parameters, determine whether an action is to be performed by a vehicle in accordance with user preference data associated with a user, the user preference data including one or more predefined rules for performing actions of a vehicle. The program code portions are also configured to, in accordance with a determination that the action is to be performed by the vehicle, cause the vehicle to perform the action.

In some embodiments of the computer program product, the action comprises at least one of an engagement or a disengagement.

In some embodiments of the computer program product, the user preference data comprises user task data associated with one or more tasks the user is to perform within the vehicle, and the determination of whether the action is to be performed is further based on at least one of the one or more tasks the user is performing within the vehicle during traversal of the route.

In some embodiments of the computer program product, the user preference data further comprises historical route traversal data associated with the user, and the determination of whether the action is to be performed is further based on a determination of whether the historical route traversal data comprises data indicative of the user having previously traversed at least a portion of the route.

The program code portions of an example embodiment are further configured to, in accordance with a determination that the vehicle is within a predefined distance of an autonomous transition region, cause presentation of a notification including information related to the autonomous transition region to the user.

In some embodiments of the computer program product, the determination of whether the action is to be performed is further in accordance with additional user preference data associated with at least one additional user in an instance in which the user and the at least one additional user occupy the vehicle.

In some embodiments of the computer program product, in an instance in which more than one user occupies the vehicle, the user preference data associated with a priority user of the more than one user is utilized in accordance with the determination of whether the action is to be performed.

The program code portions of an example embodiment are further configured to, in response to the performance of the action or an inaction by the vehicle, cause presentation of a notification including information related to the action or the inaction, receive a user input including a future preference associated with the action or the inaction, and update the user preference data to include data associated with the future preference.

The program code portions of an example embodiment are further configured to, in response to the performance of the action or an inaction by the vehicle, receive perception data from one or more sensors, with the perception data indicative of an emotional reaction of the user to the action or the inaction, and update the user preference data based at least on the perception data.

In a further example embodiment, an apparatus is provided including at least one processor and at least one memory storing computer program code, with the at least one memory and the computer program code configured to, with the processor, cause the apparatus to at least cause presentation of information related to a route, with the information comprising one or more parameters associated with one or more autonomous transition regions along the route. The at least one memory and the computer program code are also configured to, with the processor, cause the apparatus to receive one or more route adjustment preferences. The at least one memory and the computer program code are also configured to, with the processor, cause the apparatus to, based on the one or more route adjustment preferences, determine whether an action is to be performed for a respective autonomous transition region of the one or more autonomous transition regions, such that traversal of the one or more autonomous transition regions by a vehicle is capable of being performed in accordance with the determination.

In some embodiments of the apparatus, the action comprises at least one of an engagement or a disengagement.

The at least one memory and the computer program code of an example embodiment are further configured to, with the processor, cause the apparatus to, in accordance with a determination that the vehicle is within a predefined distance of an autonomous transition region, cause display of a notification comprising information related to the autonomous transition region to the user.

The at least one memory and the computer program code of an example embodiment are further configured to, with the processor, cause the apparatus to, in response to a performance of the action or an inaction by the vehicle, cause display of a notification comprising information related to the action or the inaction, receive a user input comprising a future preference associated with the action or the inaction, and update user preference data to include data associated with the future preference.

The at least one memory and the computer program code of an example embodiment are further configured to, with the processor, cause the apparatus to, in response to a performance of the action or an inaction by the vehicle, receive perception data from one or more sensors, the perception data indicative of an emotional reaction of the user to the action or the inaction, and update the user preference data based at least on the perception data.

In some embodiments of the apparatus, the one or more route adjustment preferences comprises a maximum frequency of autonomous transitions for the route.

In some embodiments of the apparatus, the one or more route adjustment preferences comprises a minimum distance for autonomous transitions for the route.

In some embodiments of the apparatus, the one or more route adjustment preferences comprises a minimum time for autonomous transitions for the route.

In a further example embodiment, a method is provided including causing presentation of information related to a route, with the information comprising one or more parameters associated with one or more autonomous transition regions along the route. The method also includes receiving one or more route adjustment preferences. The method also includes, based on the one or more route adjustment preferences, determining whether an action is to be performed for a respective autonomous transition region of the one or more autonomous transition regions, such that traversal of the one or more autonomous transition regions by a vehicle is capable of being performed in accordance with the determination.

In some embodiments of the method, the action comprises at least one of an engagement or a disengagement.

The method of an example embodiment also includes, in accordance with a determination that the vehicle is within a predefined distance of an autonomous transition region, causing display of a notification comprising information related to the autonomous transition region to the user.

The method of an example embodiment also includes, in response to a performance of the action or an inaction by the vehicle, causing display of a notification comprising information related to the action or the inaction, receiving a user input comprising a future preference associated with the action or the inaction, and updating user preference data to include data associated with the future preference.

The method of an example embodiment also includes, in response to a performance of the action or an inaction by the vehicle, receiving perception data from one or more sensors, the perception data indicative of an emotional reaction of the user to the action or the inaction, and updating the user preference data based at least on the perception data.

In some embodiments of the method, the one or more route adjustment preferences comprises a maximum frequency of autonomous transitions for the route.

In some embodiments of the method, the one or more route adjustment preferences comprises a minimum distance for autonomous transitions for the route.

In some embodiments of the method, the one or more route adjustment preferences comprises a minimum time for autonomous transitions for the route.

In a further example embodiment, an apparatus is provided including means for causing presentation of information related to a route, with the information comprising one or more parameters associated with one or more autonomous transition regions along the route. The apparatus also includes means for receiving one or more route adjustment preferences. The apparatus also includes means for, based on the one or more route adjustment preferences, determining whether an action is to be performed for a respective autonomous transition region of the one or more autonomous transition regions, such that traversal of the one or more autonomous transition regions by a vehicle is capable of being performed in accordance with the determination.

In some embodiments of the apparatus, the action comprises at least one of an engagement or a disengagement.

The apparatus of an example embodiment also includes means for, in accordance with a determination that the vehicle is within a predefined distance of an autonomous transition region, causing display of a notification comprising information related to the autonomous transition region to the user.

The apparatus of an example embodiment also includes means for, in response to a performance of the action or an inaction by the vehicle, causing display of a notification comprising information related to the action or the inaction, means for receiving a user input comprising a future preference associated with the action or the inaction, and means for updating user preference data to include data associated with the future preference.

The apparatus of an example embodiment also includes means for, in response to a performance of the action or an inaction by the vehicle, receiving perception data from one or more sensors, the perception data indicative of an emotional reaction of the user to the action or the inaction, and means for updating the user preference data based at least on the perception data.

In some embodiments of the apparatus, the one or more route adjustment preferences comprises a maximum frequency of autonomous transitions for the route.

In some embodiments of the apparatus, the one or more route adjustment preferences comprises a minimum distance for autonomous transitions for the route.

In some embodiments of the apparatus, the one or more route adjustment preferences comprises a minimum time for autonomous transitions for the route.

In a further example embodiment, a computer program product is provided that includes a non-transitory computer readable medium having program code portions stored thereon with the program code portions being configured, upon execution, to cause presentation of information related to a route, with the information comprising one or more parameters associated with one or more autonomous transition regions along the route. The program code portions are also configured to receive one or more route adjustment preferences. The program code portions are also configured to, based on the one or more route adjustment preferences, determine whether an action is to be performed for a respective autonomous transition region of the one or more autonomous transition regions, such that traversal of the one or more autonomous transition regions by a vehicle is capable of being performed in accordance with the determination.

In some embodiments of the computer program product, the action comprises at least one of an engagement or a disengagement.

The program code portions of an example embodiment are further configured to, in accordance with a determination that the vehicle is within a predefined distance of an autonomous transition region, cause display of a notification comprising information related to the autonomous transition region to the user.

The program code portions of an example embodiment are further configured to, in response to a performance of the action or an inaction by the vehicle, cause display of a notification comprising information related to the action or the inaction, receive a user input comprising a future preference associated with the action or the inaction, and update user preference data to include data associated with the future preference.

The program code portions of an example embodiment are further configured to, in response to a performance of the action or an inaction by the vehicle, receive perception data from one or more sensors, the perception data indicative of an emotional reaction of the user to the action or the inaction, and update the user preference data based at least on the perception data.

In some embodiments of the computer program product, the one or more route adjustment preferences comprises a maximum frequency of autonomous transitions for the route.

In some embodiments of the computer program product, the one or more route adjustment preferences comprises a minimum distance for autonomous transitions for the route.

In some embodiments of the computer program product, the one or more route adjustment preferences comprises a minimum time for autonomous transitions for the route.

In a further example embodiment, an apparatus is provided that includes at least one processor and at least one memory storing computer program code, with the at least one memory and the computer program code configured to, with the processor, cause the apparatus to at least cause presentation of a notification comprising a plurality of options for one or more autonomous transition regions. The at least one memory and the computer program code are also configured to, with the processor, cause the apparatus to receive user input from a user, the user input comprising a selection of at least one option of the plurality of options. The at least one memory and the computer program code are also configured to, with the processor, cause the apparatus to, in response to receiving the user input, generate a rule defining one or more actions to be performed or to not be performed based at least on the selection of the at least one option. The at least one memory and the computer program code are also configured to, with the processor, cause the apparatus to store the rule in association with user preference data of the user, such that the one or more actions are automatically determined to be performed or to not be performed during future traversal of the one or more autonomous transition regions.

The at least one memory and the computer program code of an example embodiment are further configured to, with the processor, cause the apparatus to cause presentation of information associated with the rule, the rule stored in association with the user preference data in response to a user selection comprising a positive affirmation of the rule.

In some embodiments of the apparatus, the one or more options are based at least on one or more autonomous transition region parameters of the one or more autonomous transition regions.

In a further example embodiment, an apparatus is provided that includes means for causing presentation of a notification comprising a plurality of options for one or more autonomous transition regions. The apparatus also includes means for receiving user input from a user, the user input comprising a selection of at least one option of the plurality of options. The apparatus also includes means for, in response to receiving the user input, generating a rule defining one or more actions to be performed or to not be performed based at least on the selection of the at least one option. The apparatus also includes means for storing the rule in association with user preference data of the user, such that the one or more actions are automatically determined to be performed or to not be performed during future traversal of the one or more autonomous transition regions.

The apparatus of an example embodiment further includes means for causing presentation of information associated with the rule, the rule stored in association with the user preference data in response to a user selection comprising a positive affirmation of the rule.

In some embodiments of the apparatus, the one or more options are based at least on one or more autonomous transition region parameters of the one or more autonomous transition regions.

In a further example embodiment, a method is provided that includes causing presentation of a notification comprising a plurality of options for one or more autonomous transition regions. The method also includes receiving user input from a user, the user input comprising a selection of at least one option of the plurality of options. The method also includes, in response to receiving the user input, generating a rule defining one or more actions to be performed or to not be performed based at least on the selection of the at least one option. The method also includes storing the rule in association with user preference data of the user, such that the one or more actions are automatically determined to be performed or to not be performed during future traversal of the one or more autonomous transition regions.

The method of an example embodiment further includes causing presentation of information associated with the rule, the rule stored in association with the user preference data in response to a user selection comprising a positive affirmation of the rule.

In some embodiments of the method, the one or more options are based at least on one or more autonomous transition region parameters of the one or more autonomous transition regions.

In a further example embodiment, a computer program product is provided that includes a non-transitory computer readable medium having program code portions stored thereon with the program code portions being configured, upon execution, to cause presentation of a notification comprising a plurality of options for one or more autonomous transition regions. The program code portions are also configured to receive user input from a user, the user input comprising a selection of at least one option of the plurality of options. The program code portions are also configured to, in response to receiving the user input, generate a rule defining one or more actions to be performed or to not be performed based at least on the selection of the at least one option. The program code portions are also configured to store the rule in association with user preference data of the user, such that the one or more actions are automatically determined to be performed or to not be performed during future traversal of the one or more autonomous transition regions.

The program code portions of an example embodiment are further configured to, with the processor, cause the apparatus to cause presentation of information associated with the rule, the rule stored in association with the user preference data in response to a user selection comprising a positive affirmation of the rule.

In some embodiments of the computer program product, the one or more options are based at least on one or more autonomous transition region parameters of the one or more autonomous transition regions.

BRIEF DESCRIPTION OF THE DRAWINGS

Figure 1:
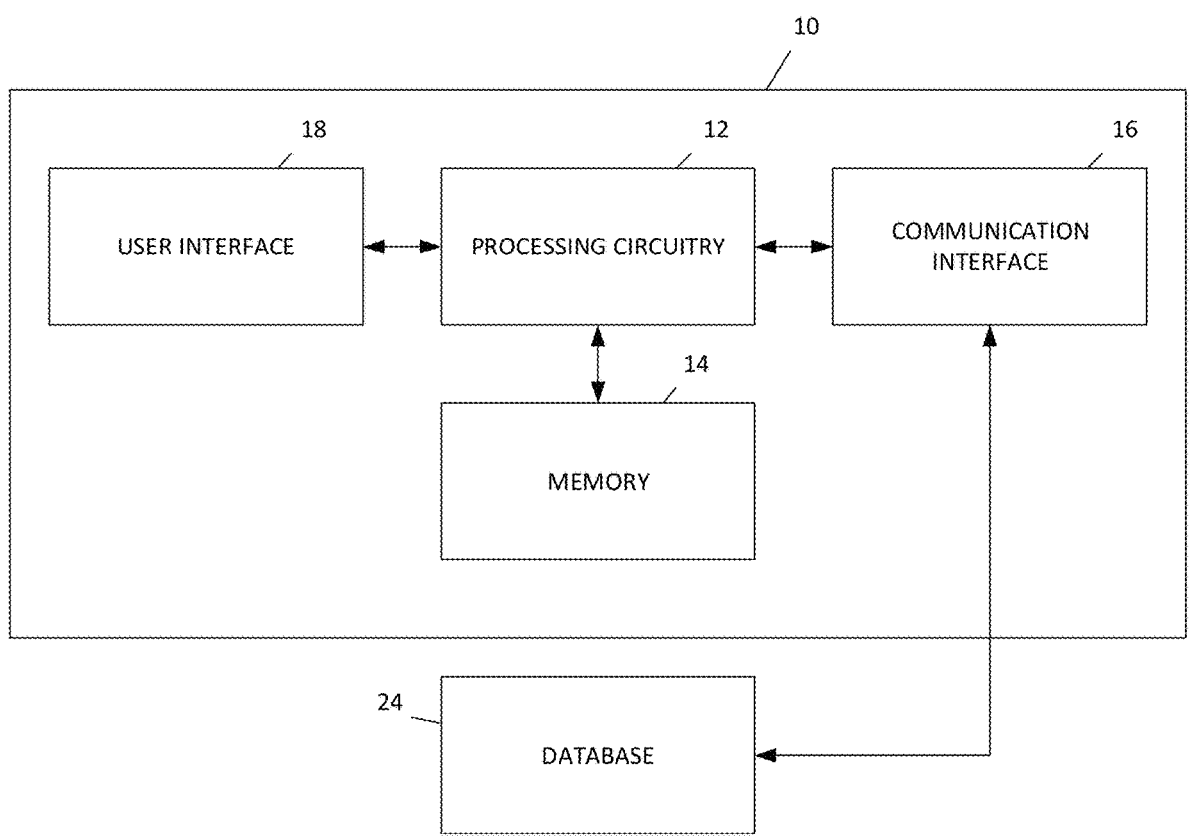
Figure 2:
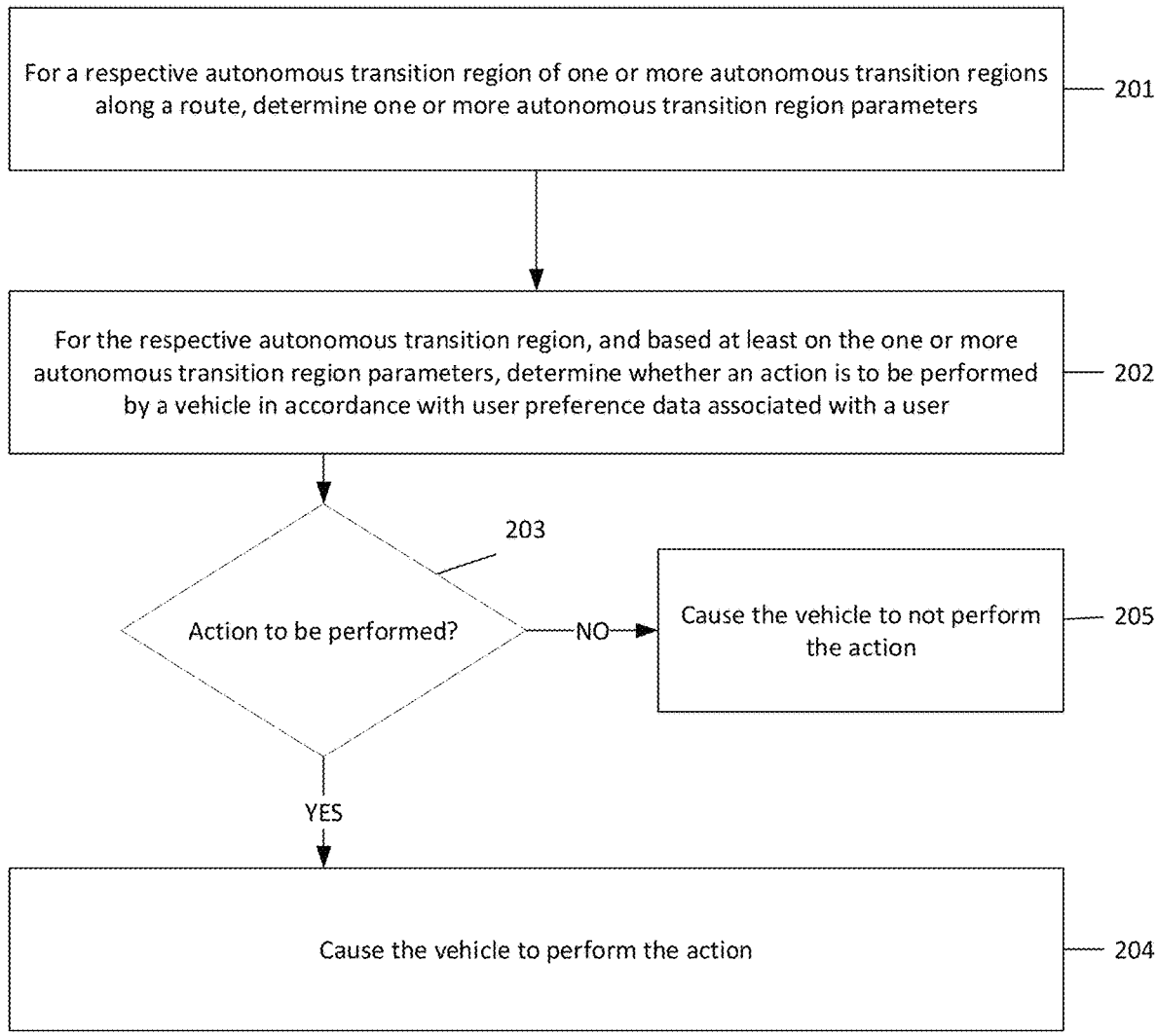
Figure 3:
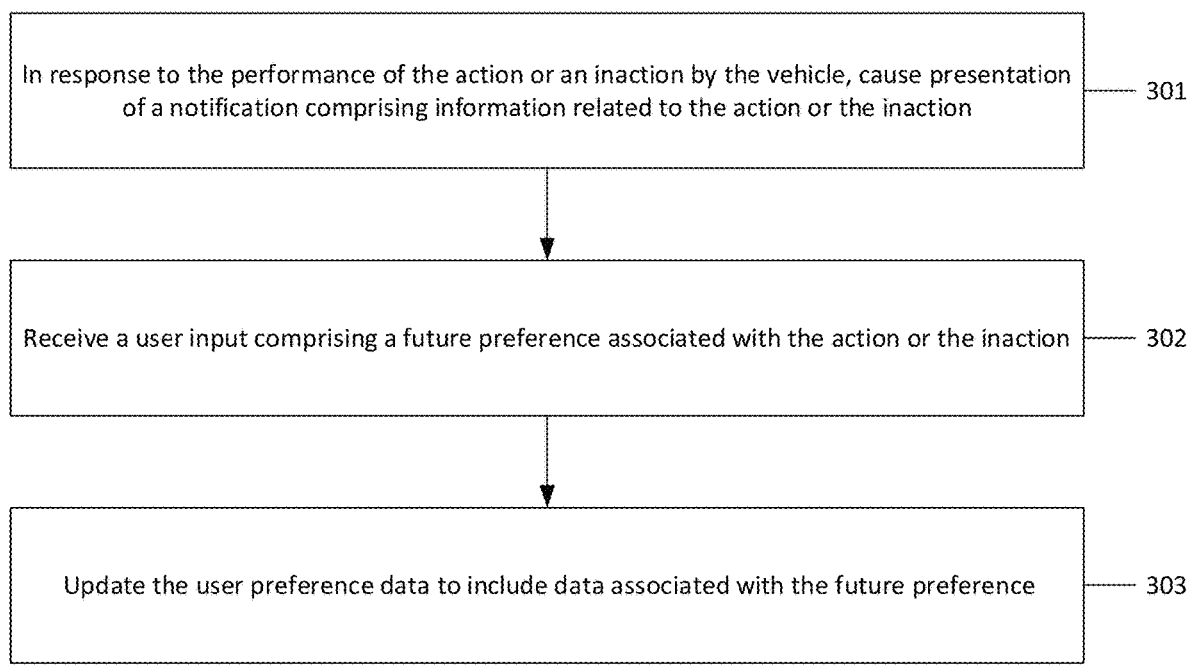
Figure 4:
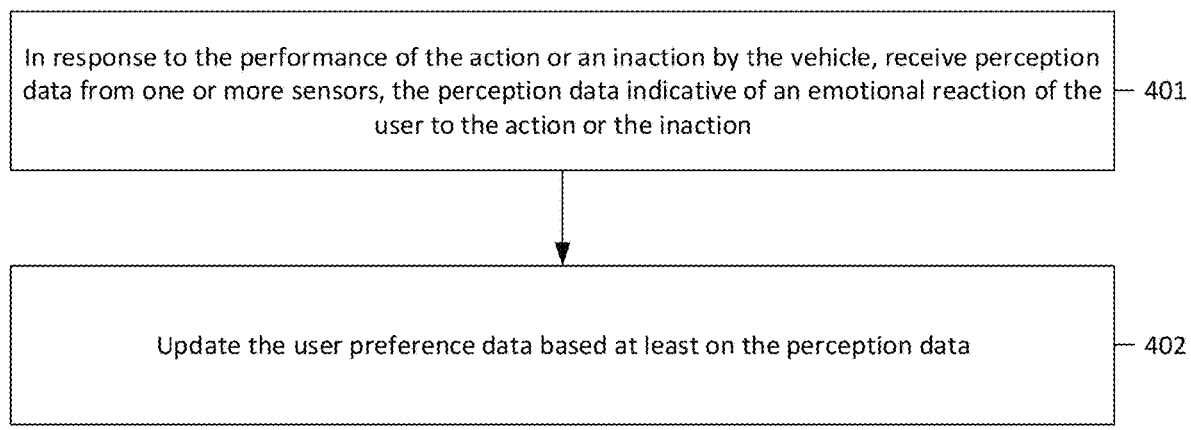
Figure 5:
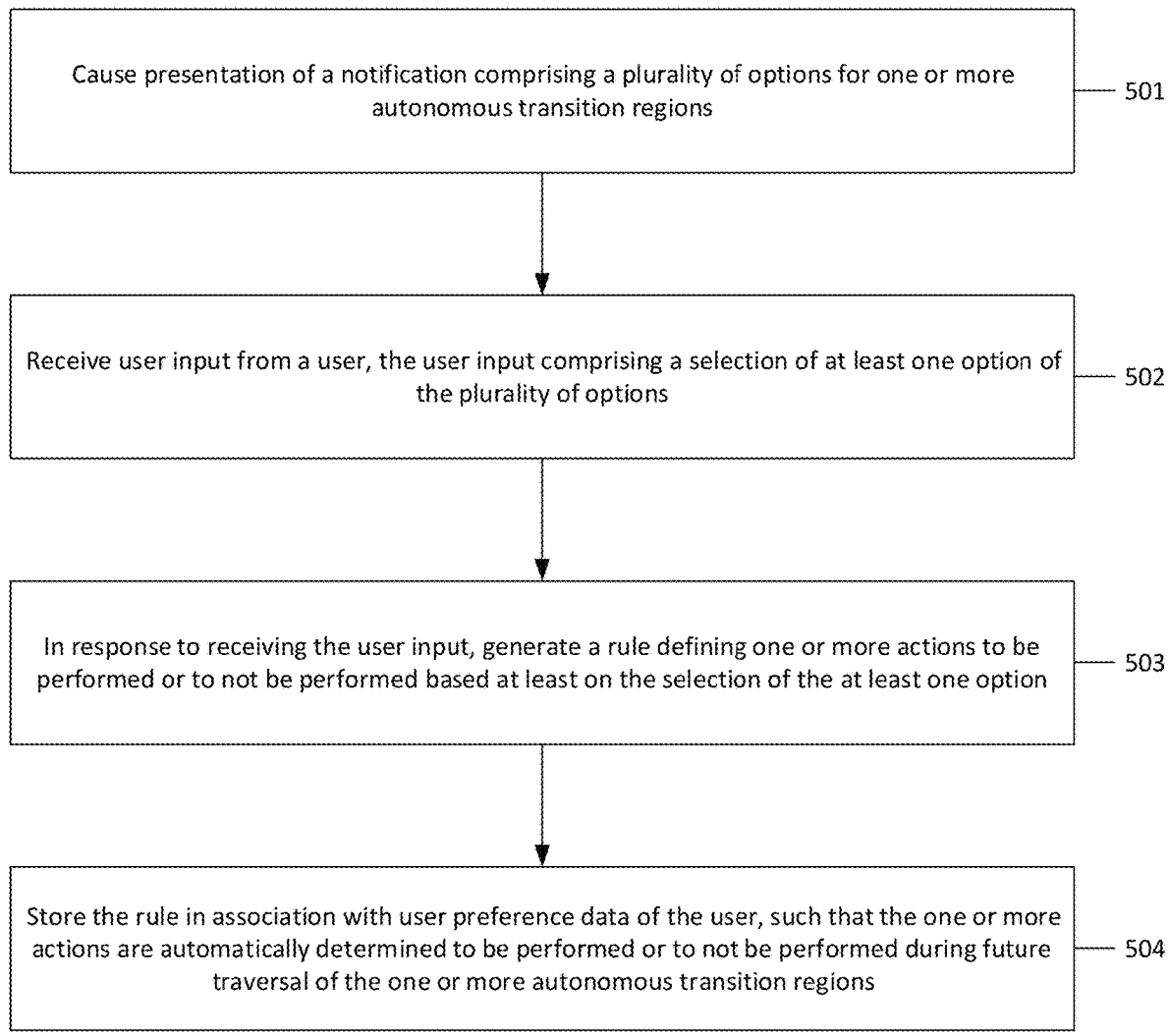
Figure 6:
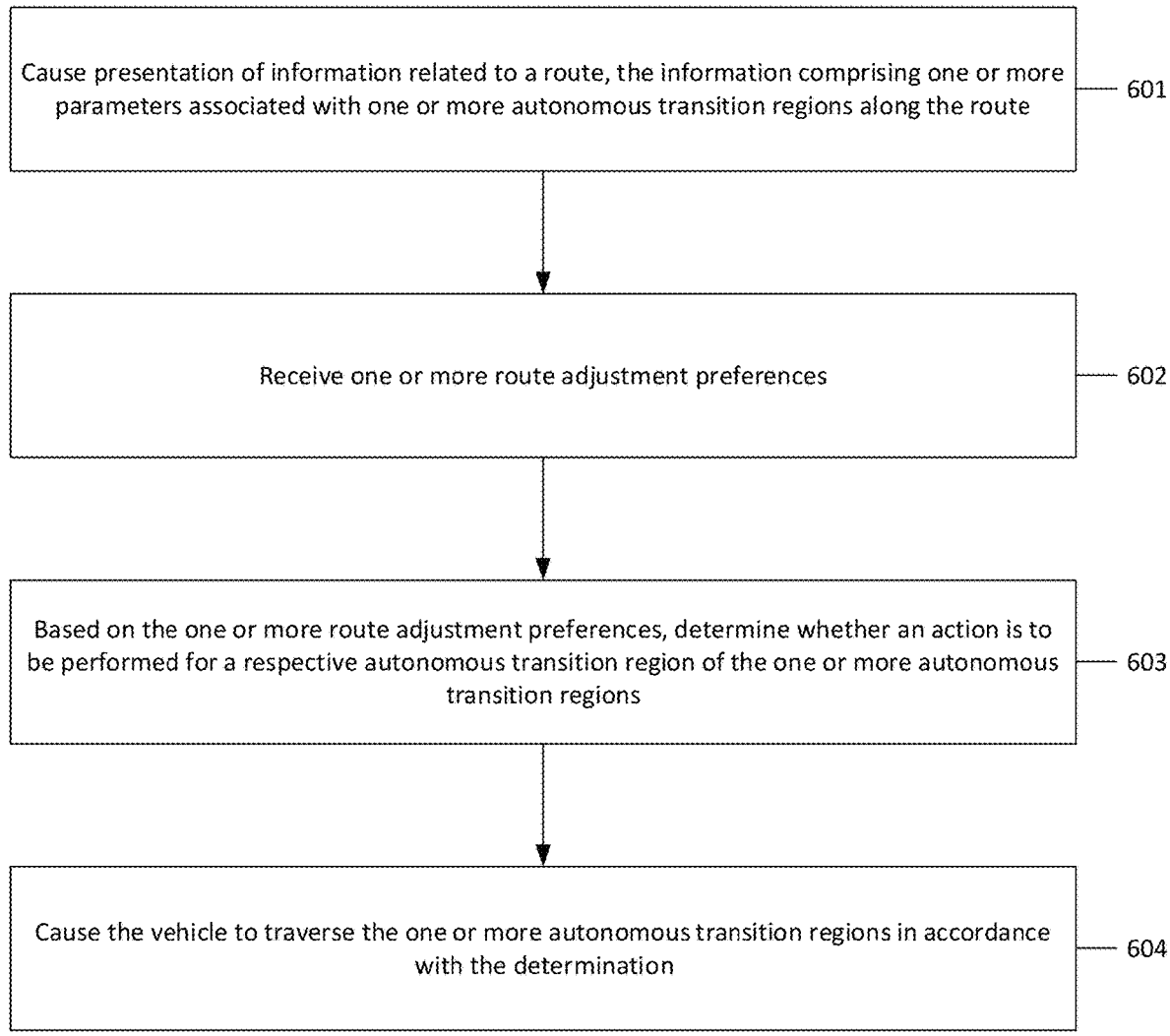
Figure 7:
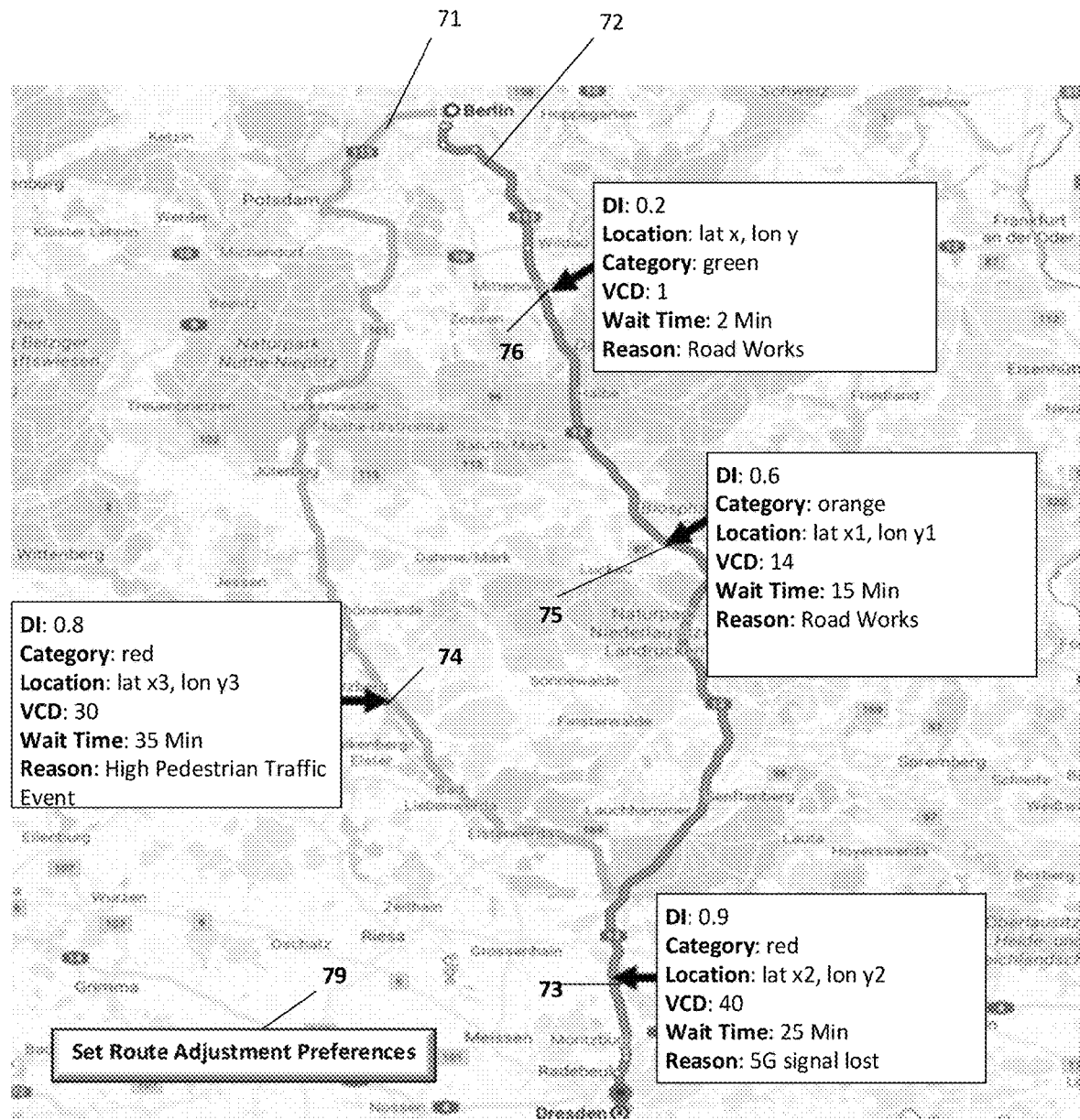

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment;

FIG. 2 is a flowchart illustrating the operations performed, such as by the apparatus of FIG. 1, in order to determine an action to be performed in accordance with an example embodiment;

FIG. 3 is a flowchart illustrating the operations performed, such as by the apparatus of FIG. 1, in order to update user preference data via presentation of information related to an action in accordance with an example embodiment;

FIG. 4 is a flowchart illustrating the operations performed, such as by the apparatus of FIG. 1, in order to update user preference data based on received perception data in accordance with an example embodiment;

FIG. 5 is a flowchart illustrating the operations performed, such as by the apparatus of FIG. 1, in order to generate a rule based on user input such that one or more actions are automatically performed during a future route traversal in accordance with an example embodiment;

FIG. 6 is a flowchart illustrating the operations performed, such as by the apparatus of FIG. 1, in order to determine an action to be performed based on received route adjustment preferences in accordance with an example embodiment; and FIG. 7 is a graphical representation of an example user interface in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As described above, vehicles having autonomous functionalities (e.g., parking assist, lane change assist, lane keeping assist and/or the like) as well as fully autonomous vehicles (e.g., self-driving vehicles) have and will continue to improve conditions on roadways by reducing hazards such as distracted and/or impaired driving and other human errors. Such vehicles may be defined by a particular level of autonomy at which they operate. For example, a vehicle operating at "level 0" autonomy may issue warnings to a driver or may momentarily intervene but provides no sustained autonomous control. A vehicle operating at "level 1" autonomy may provide features such that the driver and the automated system share control of the vehicle (e.g., cruise control, parking assist, lane keeping assist, etc.).

A vehicle operating at "level 2" autonomy may comprise an automated system which takes full control of the vehicle, including accelerating, braking, and steering. However, the driver must monitor the automated driving and be prepared to intervene immediately at a time when the automated system fails to respond properly. A vehicle operating at "level 3" autonomy may allow the occupant to turn their attention away from driving tasks. The "level 3" vehicle will handle situations that call for an immediate response, such as emergency braking. However, the driver must still be prepared to intervene within some limited time when called upon by the vehicle to do so.

A vehicle operating at "level 4" autonomy may require no driver attention for safety. For example, the occupant of the vehicle may sleep and/or leave the driver's seat during a commute. Further, a vehicle operating at "level 5" autonomy may require no human intervention at all. For example, the vehicle may, in some instances, be empty of occupants and be equipped to self-navigate. Examples may include a robotic taxi service and/or delivery service.

Autonomous vehicles may further improve existing business models, such as ride share or taxi services. In this regard, autonomous vehicles may be utilized for ride share services, reducing the need for labor costs of human drivers and improving user experience of the ride share service. Further, autonomous vehicles may allow for more consistency and predictability so as to potentially reduce accidents and may be operated in a more efficient and cost-effective manner.

Within certain regions along a route, a vehicle may require disengagement from autonomous functionality (e.g., transition to a lower level of autonomy) and a passenger within the vehicle to assume manual control or more manual control of the vehicle, at least until the region is traversed. Likewise, within certain other regions, the vehicle may resume autonomous functionality, and/or transition to a different, higher level of autonomy (e.g., from level 3 to level 4). In some instances, the passenger may be required in some regions to direct the vehicle to resume autonomous control and/or change autonomy levels. In other instances, resumption of autonomous control and/or autonomous level transitions may be performed automatically by the vehicle. These regions are generally referenced as transition regions or autonomous transition regions.

As described herein, an autonomous level transition more generally includes any change in autonomy level. In this regard, an autonomous level transition is a change in the level of autonomy which in some embodiments results in a complete disconnection from autonomous functionality (e.g., to a manually-driven mode), but in other embodiments maintains some degree of autonomy with the level of autonomy changing (e.g., changing to a lower level of autonomy, referred to herein as a disengagement). Similarly, an autonomous level transition may be a change from a particular level of autonomy to a higher level of autonomy (e.g., from level 2 to level 4) or, in some embodiments a connection to autonomous functionality from a disengaged mode (e.g., a manually-driven mode), all referred to herein as an engagement.

Some examples of a region that requires a disengagement (herein referred to as a disengagement region) may include a region undergoing road work (e.g., under construction, having one or more lane closures, and/or the like), a high pedestrian traffic area (e.g., bus stops, school zone crossings, and/or the like), a region experiencing inclement conditions (e.g., black ice, etc.), a region having roadways with high curvature and/or slope, and/or a region that experiences a poor cellular signal, thereby limiting communication with the vehicle.

Some examples of a region in which a vehicle may perform an engagement (herein referred to as an engagement region) may include a region such as a highway that includes straight paths and/or wide lanes, sparsely populated regions (e.g., country roads), regions with above average cellular coverage, and/or the like.

Although one or more autonomous vehicles will disengage upon entering a particular disengagement region, not all autonomous vehicles need disengage upon encountering the disengagement region as some autonomous vehicles are capable of maintaining autonomy under certain conditions, such as when experiencing inclement conditions, while other autonomous vehicles are not so capable. Similarly, although one or more autonomous vehicles will engage (e.g., transition to a higher level of autonomy) upon entering or while within an engagement region, not all autonomous vehicles are capable of such higher levels of autonomy. For example, for some vehicles, the highest level of autonomy possible may be level 1 (e.g., vehicles having cruise control, parking assist, and the like, but no sustained self-driving capabilities). In this regard, such vehicles are not equipped to transition to a higher level of autonomy when in an engagement region allowing for, for example, level 3 autonomy.

Different users of autonomous vehicles may have different priorities while traversing a route. For example, a user may desire time within the autonomous vehicle to be spent on non-driving tasks (e.g., reading, napping, working, etc.) and prefer for the vehicle to maintain operation in an autonomous mode and to avoid disengagements when possible. A different user may prefer to remain at a particular level of autonomy such that the user can maintain a degree of control over the vehicle (e.g., a user not comfortable with fully autonomous driving). In another example, a user may prefer the vehicle autonomously traverse areas with which the user is not familiar, while also preferring to manually control the vehicle when in familiar areas (e.g., neighborhood, home town, etc.).

A method, apparatus and computer program product are provided in accordance with an example embodiment in order to improve user experience within autonomous vehicles traversing autonomous transition regions by causing the vehicle to perform actions while utilizing personal user preference data along with parameters of autonomous transition regions along a route.

The apparatus that is configured to improve user experiences based on personal preference data and autonomous transition region parameters may be any of a wide variety of computing devices. For example, the apparatus may be embodied by a server, a computer workstation, a distributed network of computing devices, a personal computer, a navigation or mapping system, an advanced driver-assistance system (ADAS) or any other type of computing device including mobile computing devices, such as a mobile telephone, personal computer, tablet computer, personal navigation device or the like.

Regardless of the manner in which the apparatus is embodied, however, the apparatus 10 includes, is associated with, or is in communication with processing circuitry 12, memory 14, a communication interface 16 and optionally a user interface 18 as shown in FIG. 1. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally or alternatively, the memory can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., map data, route data, etc.) generated and/or employed by the processing circuitry 12. Additionally or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to vehicle or vehicle to infrastructure wireless links.

The map database of database 24 may include node data, road segment data or link data, point of interest (POI) data, traffic data or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database. As noted above, the map database accessed by an apparatus 10 of an example embodiment includes information regarding one or more map objects including information regarding the type of map object and the location of the map object.

The map database of database 24 may be maintained by a content provider e.g., the map data service provider and may be accessed, for example, by the content or service provider processing server. By way of example, the map data service provider can collect geographic data and dynamic data to generate and enhance the map database and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database of database 24 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database of database 24 may be a master geographic database, but in alternate embodiments, a client side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Referring now to FIG. 2, the operations performed, such as by the apparatus 10 of FIG. 1, in order to determine whether an autonomous transition is to be performed are depicted. As shown in block 201, the apparatus includes means, such as the processing circuitry 12, memory 14, and/or the like, for determining one or more autonomous transition region parameters for a respective autonomous transition region of one or more autonomous transition regions along a route.

For example, the route may be a route which a user is to traverse or currently traversing within an autonomous vehicle in order to reach an intended destination.

In some embodiments, the respective autonomous transition region may be a region in which an autonomous vehicle is currently located or a region which the autonomous vehicle is within a predefined distance of (e.g., the vehicle has yet to enter the autonomous region but is to do so based on the route).

An autonomous transition region may be associated with one or more autonomous transition parameters. For example, with respect to disengagement regions, one or more autonomous transition parameters may include a current disengagement index value, a disengagement start location, a severity categorization, a value representing a number of vehicles currently disengaged within the disengagement region, a value representing a current wait time, a disengagement reason, a historic autonomous transition value, or the like.

A current disengagement index value may comprise a value on a scale (e.g., a value between 0 and 1) representative of a current condition of the associated disengagement region. For example, a higher current disengagement index may be indicative of a more severe condition of the disengagement region (e.g., a large amount of disengaged vehicles currently present within the disengagement region, inclement weather conditions present within the disengagement region, etc.). Conversely, a lower current disengagement index may be indicative of a less severe condition of the disengagement region (e.g., a small number of disengaged vehicles currently present within the disengagement region, short waiting times within the disengagement region, etc.).

In addition to a current disengagement index value, a severity categorization may be determined based on the current disengagement index value. For example, the severity categorization may be a color-coded indication corresponding to the current disengagement index value. As one example, a high current disengagement index value (e.g., greater than 0.8) may correspond to a severity categorization of "red." Likewise, a lower current disengagement index value (e.g., less than 0.3) may correspond to a severity categorization of "green." In this regard, the severity categorization may provide a user-friendly and easily readable assessment of a particular candidate route.

A historic autonomous transition value may be a value representing a historic number of autonomous transitions performed (e.g., by one or more vehicles that have historically traversed a respective autonomous transition region) for a respective autonomous transition region. For example, the historic autonomous transition value may be temporally based such that it represents a total number of autonomous transitions (e.g., engagements or disengagements) for a respective autonomous transition region for a particular time period (e.g., all time total autonomous transitions, autonomous transitions in the past thirty (30) days, autonomous transitions for the past 7 days, etc.).

The disengagement start location may be identified in various manners, but, in one embodiment, comprises a pair of latitude and longitude coordinates corresponding to a location at which the disengagement region begins. For example, the disengagement start location may define a location at which a vehicle disengages or is to disengage (e.g., transition from a level of autonomy to a lower level of autonomy).

The value representing the number of vehicles currently disengaged within the disengagement region may be determined based on data from a plurality of disengaged vehicles within the disengagement region received by the apparatus and/or stored in database 24 or another computing device with which the apparatus is in communication. The value may be further based on timestamps associated with the received data. As an example, data received from vehicles that have not re-engaged autonomous functionalities and comprising timestamp values within a particular period of time (e.g., the previous hour) may be used to determine the value representing number of vehicles currently disengaged within the disengagement region. For example, the number of vehicles currently disengaged in the disengagement region may be 27 since of the 30 vehicles for which data has been received within the past hour indicating that autonomous functionalities have been disengaged, only 3 vehicles have re-engaged the autonomous functionalities.

The current wait time may comprise a value representing a length of time taken by a vehicle to exit the disengagement region after having disengaged autonomous functionalities upon entering the disengagement region. This value may be based on timestamped data received by the apparatus and/or stored in database 24 or other computing device from a plurality of vehicles that have traversed the disengagement region (e.g., vehicles that have disengaged upon entry into the disengagement region and re-engaged autonomous functionalities upon exiting the disengagement region). In an embodiment, the current wait time may be an averaged value based on wait times of a plurality of vehicles that have traversed the disengagement region. Other factors may contribute to the determination of the current wait time, such as a current number of vehicles currently disengaged within the disengagement region, weather conditions, and/or the like, relative to those same factors during the time period in which the averaged value was determined.

The disengagement reason may comprise a reason for which disengagement of autonomous functionalities is caused. In some embodiments, the disengagement reason, when provided to a user interface, may provide a user-friendly and easily readable assessment of a particular candidate route. As one example, a disengagement reason may comprise a string text value "cellular signal lost" or "5G signal lost," indicative that the disengagement region comprises an area with low or no cellular coverage. In this regard, a vehicle may disengage due to an inability to maintain autonomy and/or self-navigate due to a lost network connection and/or inaccurate Global Positioning Systems (GPS) data. As another example, a disengagement reason may comprise a string text value "road works," indicative that the disengagement region comprises an area under construction.

As shown in block 202, the apparatus includes means, such as the processing circuitry 12, memory 14, the communication interface 16 or the like, for the respective autonomous transition region and based at least on one or more autonomous transition region parameters, for determining whether an action is to be performed by a vehicle in accordance with user preference data associated with the user.

User preference data may be data related to the particular user of the autonomous vehicle. For example, user preference data may comprise user profile data comprising demographic information (e.g., name, age, location, etc.), contact information (e.g., email addresses, home addresses, phone numbers, etc.) and/or any other type of personal information of the user.

User preference data may also comprise historical route traversal data. Historical route traversal data may be historical data related to routes taken and/or vehicles utilized by the user over time. Historical route traversal data and user profile data may be collected and stored over time by the apparatus 10, such as the memory 14, from one or more external sources, such as user devices belonging to the user (e.g., a mobile phone and/or the like) and/or autonomous vehicles driven by the user, such as the navigation systems of such autonomous vehicles. In an embodiment, the historical data may be received via the communication interface 16 and stored, for example, in database 24.

The historical route traversal data may include data related to autonomous transition regions, such as engagement regions and/or disengagement regions along routes that have been previously traversed by the user. For example, a plurality of parameters associated with engagement and/or disengagement regions may be collected and stored in association with the user.

User preference data may also comprise one or more predefined rules for performing actions of an autonomous vehicle. The predefined rules may, in some embodiments, be generated and/or determined by the apparatus 10 based on user input data provided to the apparatus 10. In some embodiments, the predefined rules may be directly provided to the apparatus 10 by the user (e.g., via communication interface 16 and/or user interface 18).

As one example, a predefined rule that is associated with performing actions such as autonomous transitions may define that if a disengaged autonomous vehicle of the user is within five minutes of the destination location, to not perform an engagement (e.g., to not transition to a higher level of autonomy). In this regard, the user may prefer to manually carry out the remainder of the route when close to the destination, rather than, for example, transitioning back to autonomous driving (and perhaps further disengaging again). A similar rule may define to only re-engage when the time-to-arrival is greater than ten minutes. Such rules may alleviate negative user experiences when experiencing a high autonomous transition change frequency. For example, a route may comprise a portion requiring several engagements and/or disengagements within a short distance and/or time. In this regard, some users may be uncomfortable with frequently transitioning between autonomy levels such that the rules may limit or prevent such repeated transition changes. In contrast, other users may be accepting of the repeated transition changes such that the rules allow the several engagements and/or disengagements within the short distance and/or time. In addition to temporal rules, rules may also be defined in the spatial domain. For example, a similar rule to the above in the spatial domain may define to only re-engage when the distance-to-arrival is greater than ten kilometers.

An action to be performed by the vehicle that is determined by the apparatus 10 may be any type of action. In an embodiment, the action may comprise an engagement or a disengagement of autonomous functionality or of a certain autonomy level. Another example of an action to be performed by the vehicle may be a re-routing of the vehicle.

In some embodiments, the user preference data may further comprise user task data. User task data may be associated with one or more tasks the user is to perform or is performing within the vehicle. For example, one or more tasks may include non-driving tasks, such as eating, reading, working (e.g., on a personal device such as a laptop), sleeping, and/or any other non-driving task.

In some embodiments, user task data may be received by the apparatus 10, e.g., via communication interface 16, in response to direct user input. For example, the user may input information identifying one or more tasks that the user is to perform during traversal of a route into a user interface (e.g., a user interface within the autonomous vehicle, a user interface on the user's device, and/or the like) such that information regarding the one or more tasks is transmitted to the apparatus 10. For example, a user may input a task of "eating lunch" scheduled from 1:00 PM to 2:00 PM.

In some embodiments, user task data may be received by the apparatus 10 in response to an import of application data associated with a calendar, schedule, or other planning medium associated with the user to the apparatus 10.

In some embodiments in which user preference data comprises user task data, the determination of whether an action (such as an autonomous transition) is to be performed may further be based on at least one of the one or more tasks the user is performing within the vehicle during traversal of the route. As one example, a user in an autonomous vehicle approaching a disengagement region requiring that the vehicle disengage may be associated with user task data indicating that the user is eating lunch at the time. In this regard, the task of eating lunch may indicate that the user is unavailable to assist in disengagement (e.g., take control of the vehicle) and the apparatus 10 may determine to not perform the disengagement and rather retain the current level of autonomy, or instead, determine to perform an action comprising a re-routing of the vehicle. In this regard, the vehicle may be caused to re-route to a different roadway or the like such that the vehicle can maintain (or increase) its level of autonomy and not disengage to avoid interrupting the user while eating.

In some embodiments, the determination of whether an action is to be performed may further be based on a determination of whether the historical route traversal data associated with the user comprises data indicative of the user having previously traversed at least a portion of the route. In this regard, a user that is not familiar with (e.g., having no historical route traversal data associated with) an area may prefer the vehicle to self-drive and not to be disengaged, as the vehicle may be better equipped to navigate the unfamiliar area than the user manually doing so. In such a scenario, the apparatus 10 may determine one or more actions including engagement, retainment, and/or rerouting to allow for autonomous driving as long as possible (when in an unfamiliar area) before disengaging.

In some embodiments, the determination of the action to be performed is further in accordance with additional user preference data associated with at least one additional user in an instance in which the user and the at least one additional user occupy the vehicle. For example, an autonomous vehicle may comprise more than one user, each user having their own respective user preference data. In this regard, the determination of the action to be performed may further be based on user preference data of multiple or all passengers within the vehicle. For example, the apparatus 10 may be configured to aggregate multiple user inputs of multiple users within the vehicle and, in some embodiments, execute actions based on an averaging of user preference data of the multiple users. For example, if a majority of users within the vehicle share similar user preference data, the apparatus 10 may utilize shared user preference data in order to determine actions of the autonomous vehicle. As another example, if user preference data of the users within an autonomous vehicle differs, the apparatus 10 may be configured to provide a query, such as a prompt, to the one or more users (e.g., via display at a UI and/or via audio, such as via the vehicle's speakers) for one or more particular actions to be taken. In this regard, the users of the vehicle may decide among themselves which action the vehicle should take. In some embodiments, user preference of a first user of the vehicle may be utilized for a portion of a route, while user preference data of a second user of the vehicle may be utilized for another portion of the route.

In an embodiment, in an instance in which more than one user occupies the vehicle, the user preference data associated with a priority user may be utilized in accordance with the determination of the autonomous transition to be performed. In the example of a ride share and/or taxi service, a priority user may be a user who initially requested the particular autonomous vehicle for a trip. For example, of a party of four individuals that utilize a taxi service in order to take an autonomous vehicle to a restaurant, a priority user may be the user that requested the autonomous vehicle. In this regard, the user preference data of the priority user is used (and user preference data of the other three individuals is not used) such that actions taken during the traversal of the route to the restaurant are in accordance with the user preference data of the priority user. As another example, an indication of a priority user may be input (e.g., at a user interface, via voice instruction, or the like) and provided to the apparatus 10 via communication interface 16. In this regard, one or more user(s) within a vehicle may select a priority user for the trip and input data associated with the chosen priority user to a UI or as a voice command and/or the like. In some embodiments, a priority user of the vehicle may be determined based on one or more sensors within the vehicle, such as one or more cameras and/or pressure sensors. For example, a priority user may be a user that is sitting in the driver's seat of the vehicle. As another example, a priority user may be visually determined (e.g., by a camera/sensor) based on one or more visual features of the users in the vehicle. For example, it may be determined that a priority user should be the adult user of the vehicle in an instance in which an adult and several children occupy the vehicle. As yet another example, a priority user may be a user who is most vulnerable, such as a senior citizen (e.g., an oldest user within the vehicle), an impaired user, and/or the like.

In some embodiments, the apparatus includes means, such as the processing circuitry 12, memory 14, and/or the like, for determining whether the vehicle is within a predefined distance of an autonomous transition region. For example, in an instance in which the vehicle is within a predefined distance of an autonomous transition region (e.g., an autonomous transition region is two miles ahead), the apparatus includes means, such as the processing circuitry 12, memory 14, communication interface 16 or the like, for causing presentation of a notification comprising information related to the autonomous transition region to the user. In some embodiments, presentation of the notification may be a visual presentation such as display via a user interface, an audible presentation via speakers within the autonomous vehicle, or any other means of presentation. In this regard, the user can be warned of an upcoming autonomous transition region (e.g., a disengagement region) at an optimal distance from the disengagement region start location so as to prepare to control the vehicle and/or make choices related to the autonomous transition region.

At operation 203, a decision point is reached based on whether an action is determined to be performed by the vehicle as described above and in block 202. In accordance with a determination that the action is to be performed by the vehicle, at block 204, the apparatus includes means, such as the processing circuitry 12, memory 14, the communication interface 16 or the like, for causing the vehicle to perform the action. For example, as described above, the action may be an autonomous transition, such as an engagement or a disengagement. The action may also comprise a re-routing of the vehicle, such as to avoid one or more autonomous transition regions.

In accordance with a determination that the action is not to be performed by the vehicle, at block 205, the apparatus includes means, such as the processing circuitry 12, memory 14, the communication interface 16 or the like, for causing the vehicle to not perform the action. For example, causing the vehicle to not perform the action (e.g., an inaction) may comprise a retainment of the current level of autonomy of the vehicle. A retainment comprises maintaining the same autonomy level of the vehicle. In an instance in which a determination is made as to whether an autonomous transition, such as an engagement or a disengagement, is to be performed, the action that the apparatus, such as the processing circuitry, of an example embodiment performs may be the determination as to whether an autonomous transition will be allowed or whether there will be inaction, e.g., retainment, with the autonomous transition not being performed.

For example, a retainment of the vehicle may be performed in an instance in which the user preference data comprises a rule defining that a disengaged vehicle re-engage only if the frequency of change is below five minutes. Frequency of change may represent how often a vehicle is required to perform an autonomous transition based on the autonomous transition regions along a route. In some embodiments, frequency of change may be an average frequency of change and may be directly related to the route. A route having a high number of autonomous transition regions may cause the frequency of change to be higher. Continuing with the example above, if the frequency of change is above five minutes, the apparatus 10, such as the processing circuitry 12, may be configured to determine to not re-engage, and rather, to maintain the same autonomy level under which the vehicle is currently operating.

In some embodiments, the apparatus 10, such as the processing circuitry 12, may be configured to implement one or more feedback loops in order to confirm that actions determined by the apparatus and taken by the vehicle are satisfactory to the user. FIGS. 3 and 4 illustrate two examples of updating user preference data based on a user's provided feedback as to whether actions (e.g., autonomous transitions) were appropriate and satisfactory under the circumstances at the time.

Turning to FIG. 3, in block 301, the apparatus includes means, such as the processing circuitry 12, memory 14, the communication interface 16 or the like, for, in response to the performance of the action or an inaction by the vehicle, causing presentation of a notification comprising information related to the action or the inaction.

For example, after and in response to the performance of the action (e.g., an autonomous transition), the user within the vehicle may be presented with a notification about the autonomous transition that just occurred in order to collect feedback about the transition from the user. Similarly, after and in response to an action not performed by the vehicle (e.g., an inaction such as a retainment), the user within the vehicle may be presented with a notification about the determination made to perform the retainment and/or other inaction in order to collect feedback about the inaction from the user.

In some embodiments, the information related to the action or inaction may comprise one or more autonomous transition region parameters for the autonomous transition region which the action or inaction was performed in and/or for, and one or more options for future preferences related to the action or inaction. For example, the notification may include selectable 'yes' and 'no' options as a response to a prompt asking if the user approved of and/or was satisfied with the autonomous transition or inaction (e.g., retainment). As another example, the user may be prompted, via the notification, to respond to a question asking if the user desires the vehicle to perform the action or inaction for the particular autonomous transition region and/or similar autonomous transition regions in the future. Similar autonomous transition regions may be autonomous transition regions sharing the same disengagement reason, severity categorization, and/or other autonomous transition region parameters. In some embodiments, presentation of the notification may be a visual presentation such as display via a user interface, an audible presentation via speakers within the autonomous vehicle, and/or any other means of presentation. The options may be selected via touch, mouse-click, and/or the like or by one or more voice commands.

As shown in block 302, the apparatus includes means, such as the processing circuitry 12, memory 14, the communication interface 16 or the like, for receiving a user input comprising a future preference associated with the action or the inaction. In this regard, the user input may be received in response to a user selection of an option presented via the notification. For example, in response to a prompt of the notification asking the user if they were satisfied by the previous disengagement, the user may provide (e.g., via physical selection and/or voice command) user input indicating 'yes,' 'no,' and/or another response.

As shown in block 303, the apparatus includes means, such as the processing circuitry 12, memory 14, and/or the like, for updating the user preference data to include data associated with the future preference. For example, user preference data may be updated based on the user's response to the notification. Continuing with the example above, if a disengagement occurred at a particular autonomous transition region and the user indicated they were not satisfied with the disengagement at that particular point, user preference data may be updated to include the user's preference such that future traversal of that particular autonomous transition region and/or similar autonomous transition regions having similar parameters take into account the user's satisfaction with the previous disengagement. For example, in the future, the apparatus 10, such as the processing circuitry 12, may be configured to determine to not disengage in instances similar to that of the one associated with the notification, and rather, to cause the vehicle to perform a re-routing or perform a retainment if possible.

In some embodiments, rather than providing a notification to the user following performance of an action, such as a disengagement, or inaction, such as a retainment, the apparatus 10, such as the processing circuitry 12, may be configured to collect perception data to determine a preference of the user. Turning to FIG. 4, at block 401, the apparatus includes means, such as the processing circuitry 12, memory 14, communication interface 16 and/or the like, for, in response to the performance of the action or an inaction by the vehicle, receiving perception data from one or more sensors. The perception data is indicative of an emotional reaction of the user to the action or the inaction.

Perception data may be received from one or more sensors associated with the autonomous vehicle and/or the user. For example, perception data may be collected (e.g., via communication interface 16) from one or more user devices such as a smart watch, fitness band, mobile phone, and/or the like, and/or one or more sensor devices located within, carried by or otherwise associated with the autonomous vehicle, such as user-facing cameras and/or the like. In some embodiments, the perception data may comprise time-stamped perception data. The apparatus 10 may include means, such as the processing circuitry 12, memory 14 and/or the like, for analyzing the perception data to determine a user response to the performed action or inaction. For example, the perception data may be indicative of an increased heart rate of the user after the action is performed and/or another negative reaction.

At block 402, the apparatus includes means, such as the processing circuitry 12, memory 14, communication interface 16 and/or the like, for updating the user preference data based at least on the perception data. For example, user preference data may be updated based on the perceived user response to the notification. For example, if a disengagement occurred at a particular autonomous transition region and the perception data collected relating to the user indicated a negative reaction to the disengagement at that particular point, user preference data may be updated such that future traversal of that particular autonomous transition region and/or similar autonomous transition regions having similar parameters take into account the user's reaction with the previous disengagement. For example, in the future, the apparatus 10, such as the processing circuitry 12, may be configured to determine to not disengage in instances similar to that of the one associated with the notification, and rather, to cause the vehicle to perform a re-routing or to perform a retainment if possible.

Referring now to FIG. 5, the operations performed, such as by the apparatus 10 of FIG. 1, in order to generate and store a rule based on user input such that one or more actions are automatically performed as directed by the rule during a future route traversal are depicted.

As shown in block 501, the apparatus includes means, such as the processing circuitry 12, memory 14, communication interface 16, and/or the like, for causing presentation of a notification comprising a plurality of options for one or more autonomous transition regions. In some embodiments, presentation of the notification may be a visual presentation such as display via a user interface, an audible presentation via speakers within the autonomous vehicle, or any other means of presentation.

For example, the notification may be caused to be presented in various instances, such as before embarking on a route, during traversal of a route and prior to entering or while within a respective autonomous transition region, and/or the like.

For example, the user may be presented with a plurality of data including various options for traversing a respective autonomous transition region, or a respective type of autonomous transition, such as autonomous transition regions having a particular disengagement reason. For example, the notification may comprise information associated with an upcoming disengagement region, such as one or more disengagement region parameters, including but not limited to a severity categorization, a wait time, a disengagement reason, and/or the like. In this regard, the notification may alert the user to the upcoming disengagement region and present options for allowing the vehicle to perform a disengagement, retaining a current level of autonomy (e.g., a retainment), and/or performing a re-routing of the vehicle.

As shown in block 502, the apparatus includes means, such as the processing circuitry 12, memory 14, communication interface 16, and/or the like, for receiving user input from a user. The user input comprises a selection of at least one option of the plurality of options.

For example, the user may select, such as via the user interface 18, an option for the particular autonomous transition region or type of autonomous transition region. In this regard, the user may also provide additional information related to the selection of the option, such as a reason for the selection. For example, the user may indicate that they are presently eating, working, or performing another non-driving task and would prefer that the vehicle not perform a disengagement requiring the user to intervene.

As shown in block 503, the apparatus includes means, such as the processing circuitry 12, memory 14, and/or the like, for, in response to receiving the user input, generating a rule defining one or more actions to be performed or to not be performed based at least on the selection of the at least one option.

Continuing with the example above, the apparatus 10, such as the processing circuitry 12, may be configured to generate a rule defining that, for the next hour, the vehicle should avoid disengaging when possible (e.g., such that the user may focus on eating or their other non-driving tasks) and instead, retain the current level of autonomy and/or re-route if necessary to maintain the current level of autonomy. Thus, in accordance with this rule, maintaining the current level of autonomy is prioritized relative to other factors, such as travel time, distance traveled, etc.

As shown in block 504, the apparatus 10 includes means, such as the processing circuitry 12, memory 14, communication interface 16, and/or the like, for storing the rule in association with user preference data of the user. Thus, the one or more actions are automatically determined to be performed or to not be performed by the apparatus 10, such as the processing circuitry 12, in accordance with the rule during future traversal of the one or more autonomous transition regions or autonomous transition regions having a similar disengagement reason and/or other autonomous transition region parameters.

In some embodiments, the apparatus 10 includes means, such as the processing circuitry 12, memory 14, communication interface 16, and/or the like, for causing presentation of information associated with the rule. For example, after a rule is generated (as described in block 504), a user-friendly prompt may be presented to the user (e.g., via display, audibly, and/or the like) regarding the rule. Continuing with the example above, a prompt related to a rule defining that the vehicle avoid disengagement for the next hour may comprise a question to the user such as: "Would you like to avoid disengagements for the next hour while you complete your task?" In this regard, the notification may also include selectable 'yes' and 'no' options to allow the user to respond to the prompt and affirm or deny the suggested rule. In this regard, the rule may be stored in association with the user preference data in response to a user selection comprising a positive affirmation of the rule.

Referring now to FIG. 6, the operations performed, such as by the apparatus 10 of FIG. 1, in order to determine an action to be performed based on received route adjustment preferences are depicted.

As shown in block 601, the apparatus 10 includes means, such as the processing circuitry 12, memory 14, communication interface 16, and/or the like, for causing presentation of information related to a route. In some embodiments, the notification may be in the form of a user interface, such as the user interface depicted in FIG. 7, and presentation of the notification may be a visual presentation such as display via a user device, and/or audible presentation via speakers within the autonomous vehicle, or any other means of presentation.

For example, the notification may be caused to be presented in various instances, such as before embarking on a route, during traversal of a route and prior to entering or while within a respective autonomous transition region, and/or the like.

The notification may comprise, in some embodiments, a depiction of one or more routes 71, 72 from an origin location to a destination location and/or depictions of one or more autonomous transition regions along the route. For example, one or more autonomous transition regions 73, 74, 75, 76 along the route may be color-coded or otherwise associated with distinctive indicia based on their respective severity categorizations as described above. In some embodiments, and as shown in FIG. 7, one or more autonomous transition region parameters for one or more autonomous transition regions along the route may also be presented, such as, for example, wait time, a current disengagement index value (DI), a start location, a disengagement reason, a number of vehicles currently disengaged (VCD) within the region, and/or the like.

The notification may also present one or more options to the user to adjust preferences tailored specifically to the route. For example, before embarking on a route, a user may desire to avoid disengagements during the entirety of the route. As another example, a user may desire to avoid engagements during the route and to maintain a level of manual control over the vehicle for the entirety of the trip.

In this regard, the notification may allow the user to set one or more route adjustment preferences for the route (e.g., by selecting a "set route adjustment preferences" button 79 or similar operation). As one example, the user may set a maximum frequency of autonomous transitions for the route. For example, the user may set the maximum frequency of disengagements for the route to zero or a low number, such as below a predefined lower threshold, if the user desires to traverse the route autonomously. Similarly, the user may set the maximum frequency of disengagements for the route to zero or a low number if the user desires to maintain control of the vehicle for most or all of the trip.

Another example of a route adjustment preference that a user may set is a minimum distance for autonomous transitions for the route. In this regard, the user may set a minimum distance for autonomous transitions for the route to be, for example, fifteen miles. This ensures that the vehicle will not perform an autonomous transition prior to fifteen miles before the previous autonomous transition. Another example of a route adjustment preference that a user may set is a minimum time for autonomous transitions for the route. In this regard, the user may set a minimum time for autonomous transitions for the route to be, for example, thirty minutes. This ensures that the vehicle will not perform an autonomous transition prior to thirty minutes after the previous autonomous transition. Such route adjustment preferences allow for the user to have more control over their journey in the autonomous vehicle and prevent instances in which the autonomous vehicle may disengage and re-engage many times in a short time span.

In embodiments described herein, a user providing user input and/or direction may be a user within the autonomous vehicle, such as a driver, passenger, and/or the like. However, other users may additionally or alternatively provide user input and/or direction, such as a parent, an owner/operator of the vehicle, an organization that owns the vehicle (e.g., a rental company), and/or the like.

As shown in block 602, the apparatus includes means, such as the processing circuitry 12, memory 14, communication interface 16 and/or the like, for receiving one or more route adjustment preferences. After the user has set their route adjustment preferences, the route adjustment preferences may be provided to the apparatus 10 via a user selection of the user interface. For example, a user may select a "save" button or a similar element to save their route adjustment preferences for the route, and in response, the route adjustment preferences may be transmitted to the apparatus 10, e.g., via communication interface 16. As shown in block 603, the apparatus includes means, such as the processing circuitry 12, memory 14, and/or the like, for, based the one or more route adjustment preferences, determining whether an action is to be performed for a respective autonomous transition region of the one or more autonomous transition regions. In this regard, the apparatus 10, such as the processing circuitry 12, can configure the upcoming route, including autonomous transitions to be performed or to not be performed (e.g., an inaction, such as a retainment), based on the user's route adjustment preferences. In this regard, traversal of the one or more autonomous transition regions by a vehicle may be performed in accordance with the determination.

In some embodiments, as shown in block 604, the apparatus includes means, such as the processing circuitry 12, memory 14, communication interface 16 and/or the like, for causing the vehicle to traverse the one or more autonomous transition regions in accordance with the determination.

As described above, a method, apparatus 10 and computer program product for improving user experiences within autonomous vehicles traversing autonomous transition regions are provided. By identifying and leveraging parameters of autonomous transition regions, user preference data and/or historical mobility patterns, improved user experiences within autonomous vehicles are created, and actions to be performed by an autonomous vehicle along a route may be identified in a more efficient manner, thereby leading to reduced network load and an overall improved passenger experience.

FIGS. 2-6 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory storing computer program code, the at least one memory and the computer program code configured to, with the processor, cause the apparatus to at least:
  for a respective autonomous transition region of one or more autonomous transition regions along a route, determine one or more autonomous transition region parameters;
  for the respective autonomous transition region, and based at least on the one or more autonomous transition region parameters, determine whether an action is to be performed by a vehicle in accordance with user preference data associated with a user, the user preference data comprising one or more predefined rules for performing actions of a vehicle; and
  in accordance with a determination that the action is to be performed by the vehicle, cause the vehicle to perform the action,
  wherein the action comprises at least one of an automatic engagement or disengagement of autonomous vehicle control,
  wherein the one or more predefined rules is based, at least in part, on a predetermined frequency of autonomous transitions along the route.

2. The apparatus according to claim 1, wherein the user preference data comprises user task data associated with one or more tasks the user is to perform within the vehicle, and
  wherein the determination of whether the action is to be performed is further based on at least one of the one or more tasks the user is performing within the vehicle during traversal of the route.

3. The apparatus according to claim 1, wherein the user preference data further comprises historical route traversal data associated with the user, and
  wherein the determination of whether the action is to be performed is further based on a determination of whether the historical route traversal data comprises data indicative of the user having previously traversed at least a portion of the route.

4. The apparatus according to claim 1, wherein the at least one memory and the computer program code are further configured to, with the processor, cause the apparatus to:
  in accordance with a determination that the vehicle is within a predefined distance of an autonomous transition region:
    cause presentation of a notification comprising information related to the autonomous transition region to the user.

5. The apparatus according to claim 1, wherein the determination of whether the action is to be performed is further in accordance with additional user preference data associated with at least one additional user in an instance in which the user and the at least one additional user occupy the vehicle.

6. The apparatus according to claim 1, wherein in an instance in which more than one user occupies the vehicle, the user preference data associated with a priority user of the more than one user is utilized in accordance with the determination of whether the action is to be performed.

7. The apparatus according to claim 1, wherein the at least one memory and the computer program code are further configured to, with the processor, cause the apparatus to:
in response to the performance of the action or an inaction by the vehicle, cause presentation of a notification comprising information related to the action or the inaction;
receive a user input comprising a future preference associated with the action or the inaction; and
update the user preference data to include data associated with the future preference.

8. The apparatus according to claim 1, wherein the at least one memory and the computer program code are further configured to, with the processor, cause the apparatus to:
in response to the performance of the action or an inaction by the vehicle, receive perception data from one or more sensors, the perception data indicative of an emotional reaction of the user to the action or the inaction; and
update the user preference data based at least on the perception data.

9. An apparatus comprising at least one processor and at least one memory storing computer program code, the at least one memory and the computer program code configured to, with the processor, cause the apparatus to at least:
cause presentation of information related to a route, the information comprising one or more parameters associated with one or more autonomous transition regions along the route;
receive one or more route adjustment preferences; and
based on the one or more route adjustment preferences, determine whether an action is to be performed for a respective autonomous transition region of the one or more autonomous transition regions, such that traversal of the one or more autonomous transition regions by a vehicle is capable of being performed in accordance with the determination,
wherein the action comprises at least one of an automatic engagement or disengagement of autonomous vehicle control,
wherein the one or more route adjustment preferences is based, at least in part, on a predetermined frequency of autonomous transitions along the route.

10. The apparatus according to claim 9, wherein the at least one memory and the computer program code are further configured to, with the processor, cause the apparatus to:
in accordance with a determination that the vehicle is within a predefined distance of an autonomous transition region:
cause display of a notification comprising information related to the autonomous transition region to the user.

11. The apparatus according to claim 9, wherein the at least one memory and the computer program code are further configured to, with the processor, cause the apparatus to:
in response to a performance of the action or an inaction by the vehicle, cause display of a notification comprising information related to the action or the inaction;
receive a user input comprising a future preference associated with the action or the inaction; and
update user preference data to include data associated with the future preference.

12. The apparatus according to claim 9, wherein the at least one memory and the computer program code are further configured to, with the processor, cause the apparatus to:
in response to a performance of the action or an inaction by the vehicle, receive perception data from one or more sensors, the perception data indicative of an emotional reaction of the user to the action or the inaction; and
update the user preference data based at least on the perception data.

13. The apparatus according to claim 9, wherein the predetermined frequency of autonomous transitions along the route comprises a maximum frequency of autonomous transitions for the route.

14. The apparatus according to claim 9, wherein the one or more route adjustment preferences comprises a minimum distance for autonomous transitions for the route.

15. The apparatus according to claim 9, wherein the one or more route adjustment preferences comprises a minimum time for autonomous transitions for the route.

16. An apparatus comprising at least one processor and at least one memory storing computer program code, the at least one memory and the computer program code configured to, with the processor, cause the apparatus to at least:
cause presentation of a notification comprising a plurality of options for one or more autonomous transition regions;
receive user input from a user, the user input comprising a selection of at least one option of the plurality of options;
in response to receiving the user input, generate a rule defining one or more actions to be performed or to not be performed based at least on the selection of the at least one option; and
store the rule in association with user preference data of the user, such that the one or more actions are automatically determined to be performed or to not be performed during future traversal of the one or more autonomous transition regions,
wherein the one or more actions comprises at least one of an automatic engagement or disengagement of autonomous vehicle control,
wherein the rule is based, at least in part, on a predetermined frequency of autonomous transitions.

17. The apparatus according to claim 16, wherein the at least one memory and the computer program code are further configured to, with the processor, cause the apparatus to:
cause presentation of information associated with the rule,
wherein the rule is stored in association with the user preference data in response to a user selection comprising a positive affirmation of the rule.

18. The apparatus according to claim 16, wherein the one or more options are based at least on one or more autonomous transition region parameters of the one or more autonomous transition regions.

* * * * *